Figure 1:
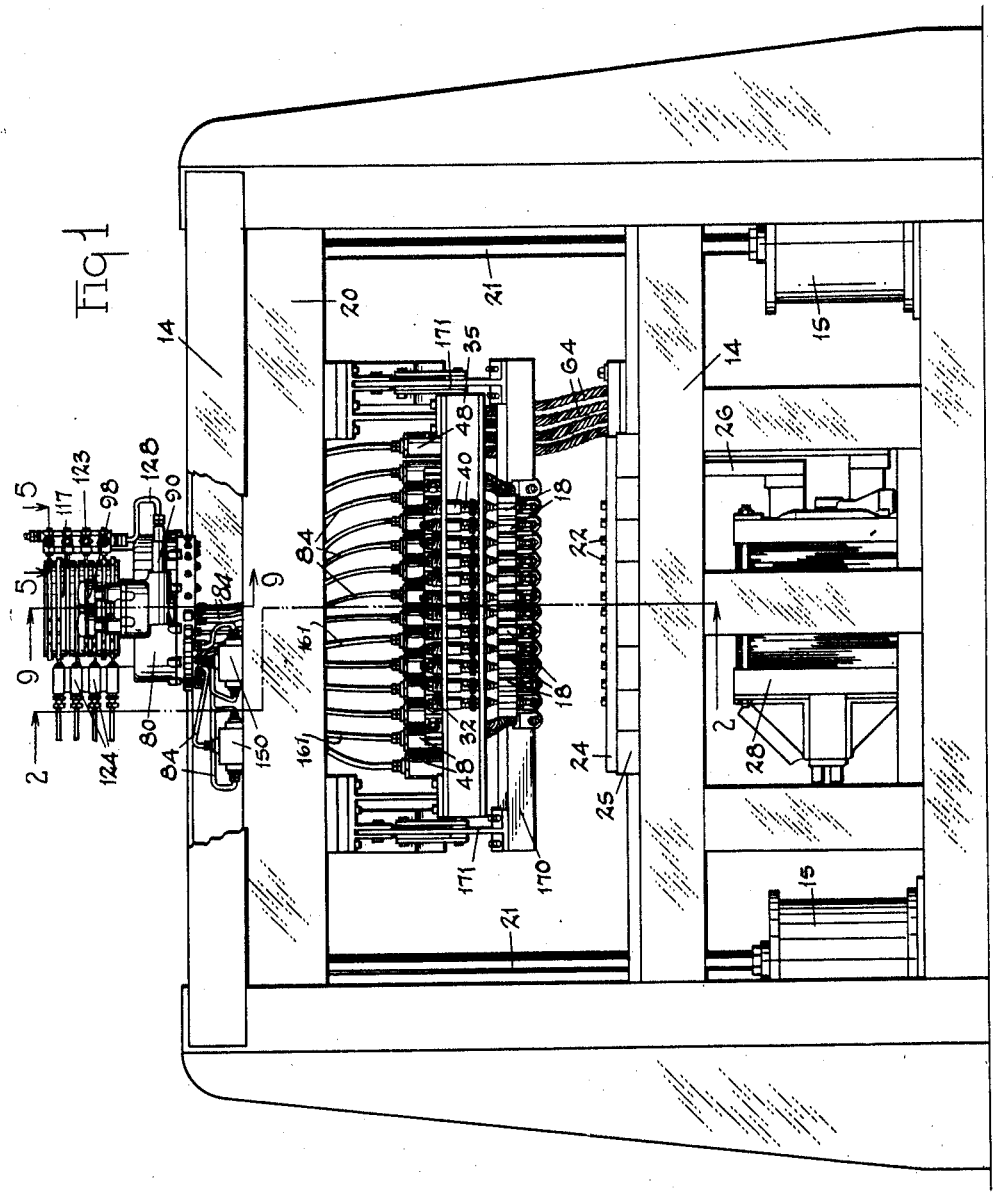

June 30, 1942. H. PURAT 2,287,945

WELDING MACHINE

Filed March 6, 1940 6 Sheets-Sheet 1

Inventor
Hugo Purat
By Faust F. Crampton
Attorney

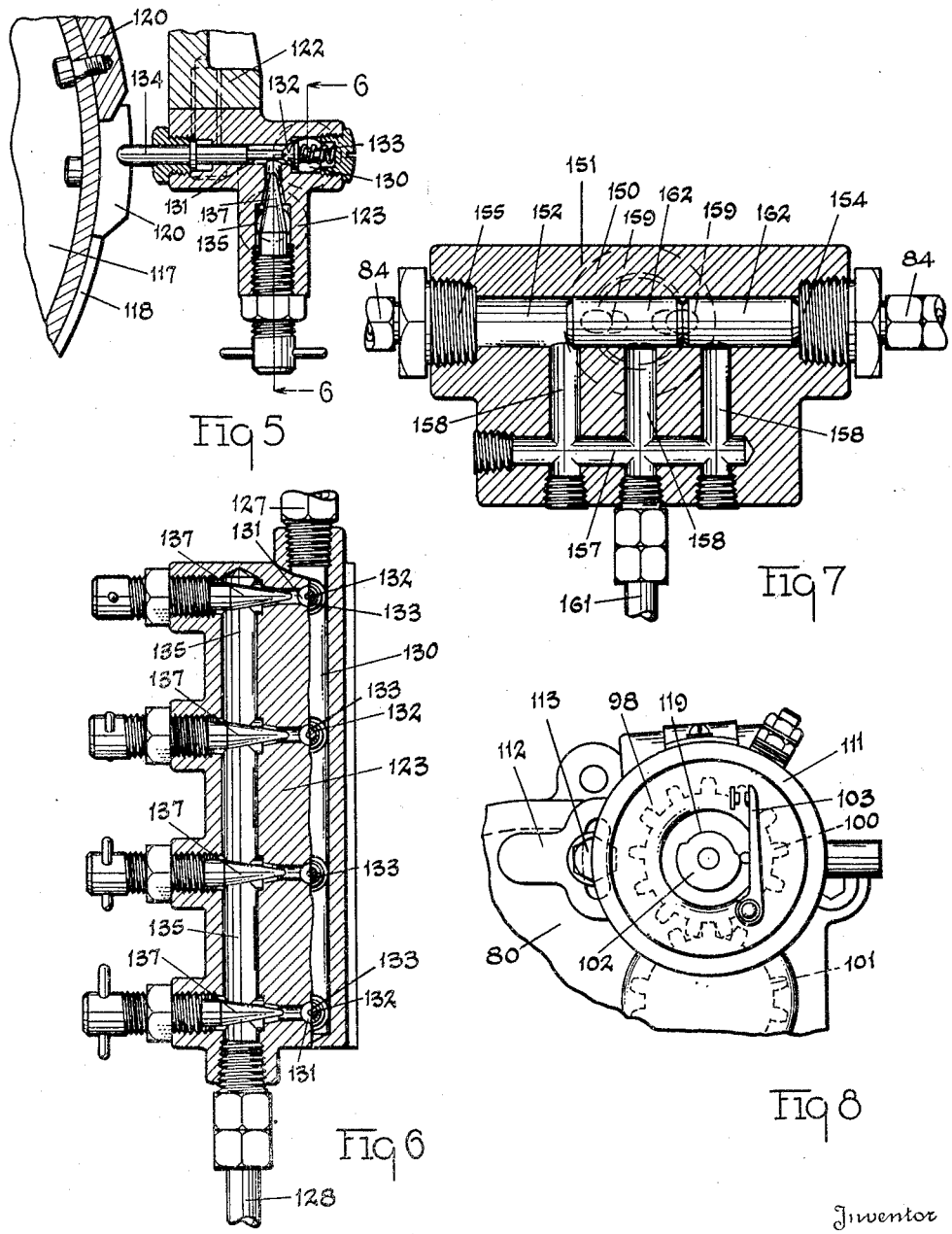

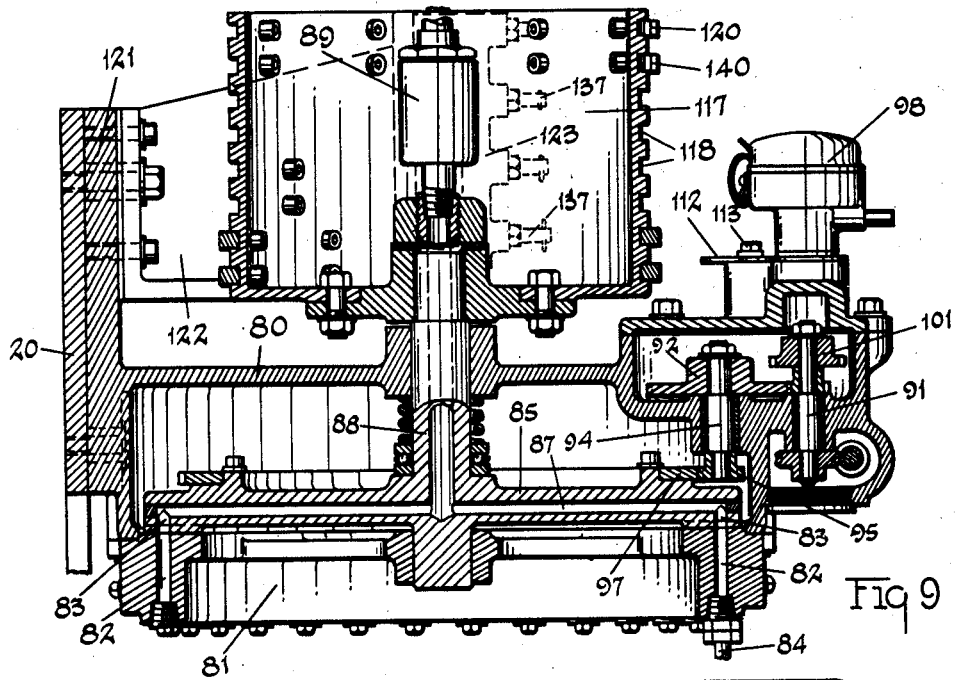
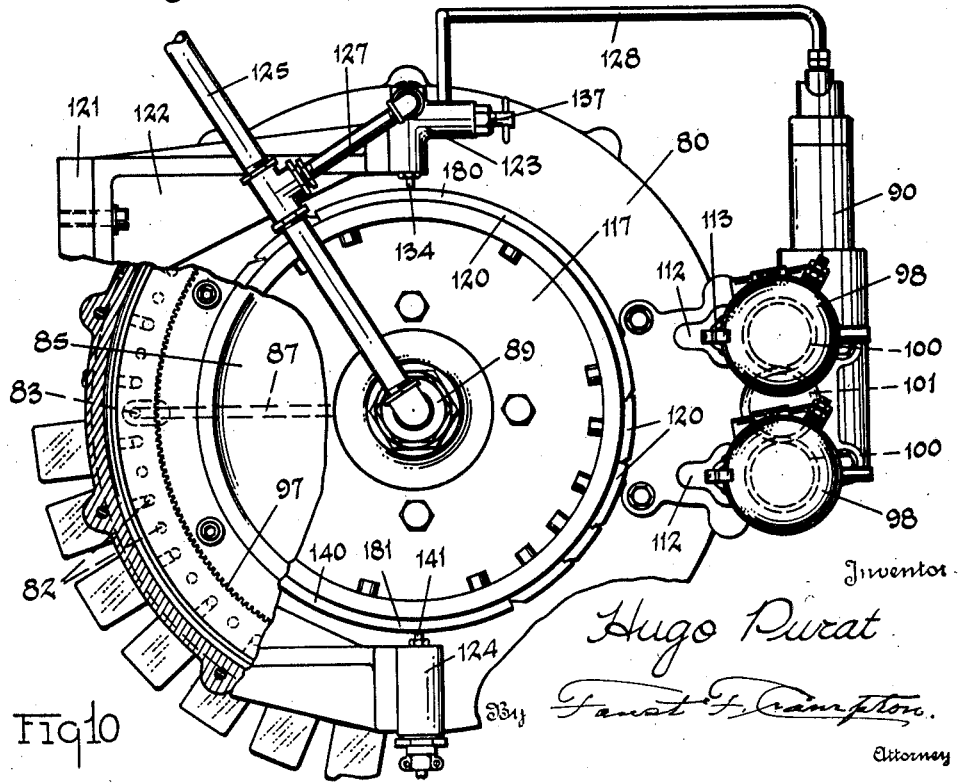

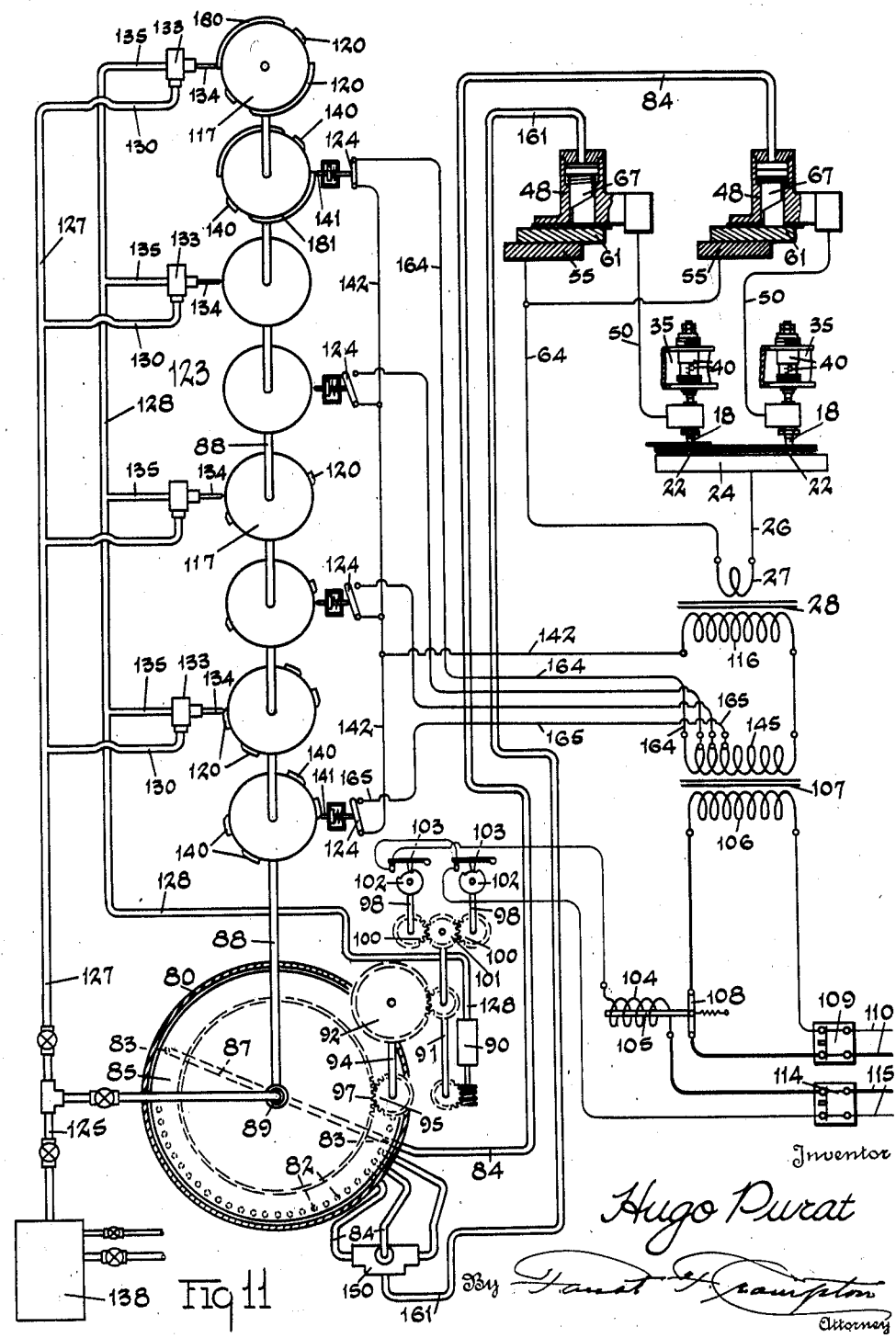

Patented June 30, 1942

2,287,945

UNITED STATES PATENT OFFICE 2,287,945

WELDING MACHINE

Hugo Purat, Detroit, Mich., assignor to Progressive Welder Company, Detroit, Mich., a corporation of Michigan Application March 6, 1940, Serial No. 322,567

8 Claims. (Cl. 219—4)

My invention has for its object to provide a plurality of welder electrodes in welding machines, and wherein the electrodes may be cushioningly mounted, with reference to their engagement with the work, and maintained in contact with the work, during a welding cycle of the machine, to hold the work. Thus, the welder electrodes may be, simultaneously, moved to and engage the work by the electrodes to secure and retain the parts of the work in suitable welding relation to eliminate various forms of clamping devices, and, also, prevent mushrooming the ends of the electrodes by striking the mark.

My invention, also, contemplates means, whereby a group of welder electrodes may be positioned along a work surface and the effective pressure of their engagement thereagainst modified, individually, to afford a requisite degree of pressure on the work. Each electrode may, also, be manipulated and its relation to the pressure may be varied to produce its individual pressure on the work and accommodate areas having increased metal thickness or resiliency or spread between parts of the work, while maintaining a desirable degree of resiliency of pressure exerted by the electrodes.

My invention, also, has for an object to provide a suitable switch element for completing the circuit of the welding current to each electrode or set of electrodes. The electrodes and the switches may, thus, be connected by short, electric, flexible conductors and eliminate a plurality of long, flexible conductors, commonly used to connect a plurality of electrodes with a source of welding current.

My invention has for a further object to provide a means for controlling the sequential operations of a plurality of welder electrodes within a welding cycle. Variations may be made, selectively, to produce the required duration of the flow of the welding current, the necessary potential, and the repetitive completion of the circuit through each welder, where required. The parts of the construction, embodying my invention, are so formed that they may be, electrically or pneumatically, operated to produce efficient welding operations in a minimum period of time.

The invention consists in other features, which will appear from the following description and upon examination of the drawings forming a part hereof. Structures containing the invention may partake of different forms and may be varied in their details and still embody the invention. To illustrate a practical application of the invention, I have selected a welding machine as an example of the various structures containing the invention, and shall describe the selected welding machine hereinafter, it being understood that certain features of my invention may be used to advantage without a corresponding use of other features of the invention, and without departing from the spirit of the invention, as presented in the claims. The particular structure selected is shown in the accompanying drawings.

Figure 2:
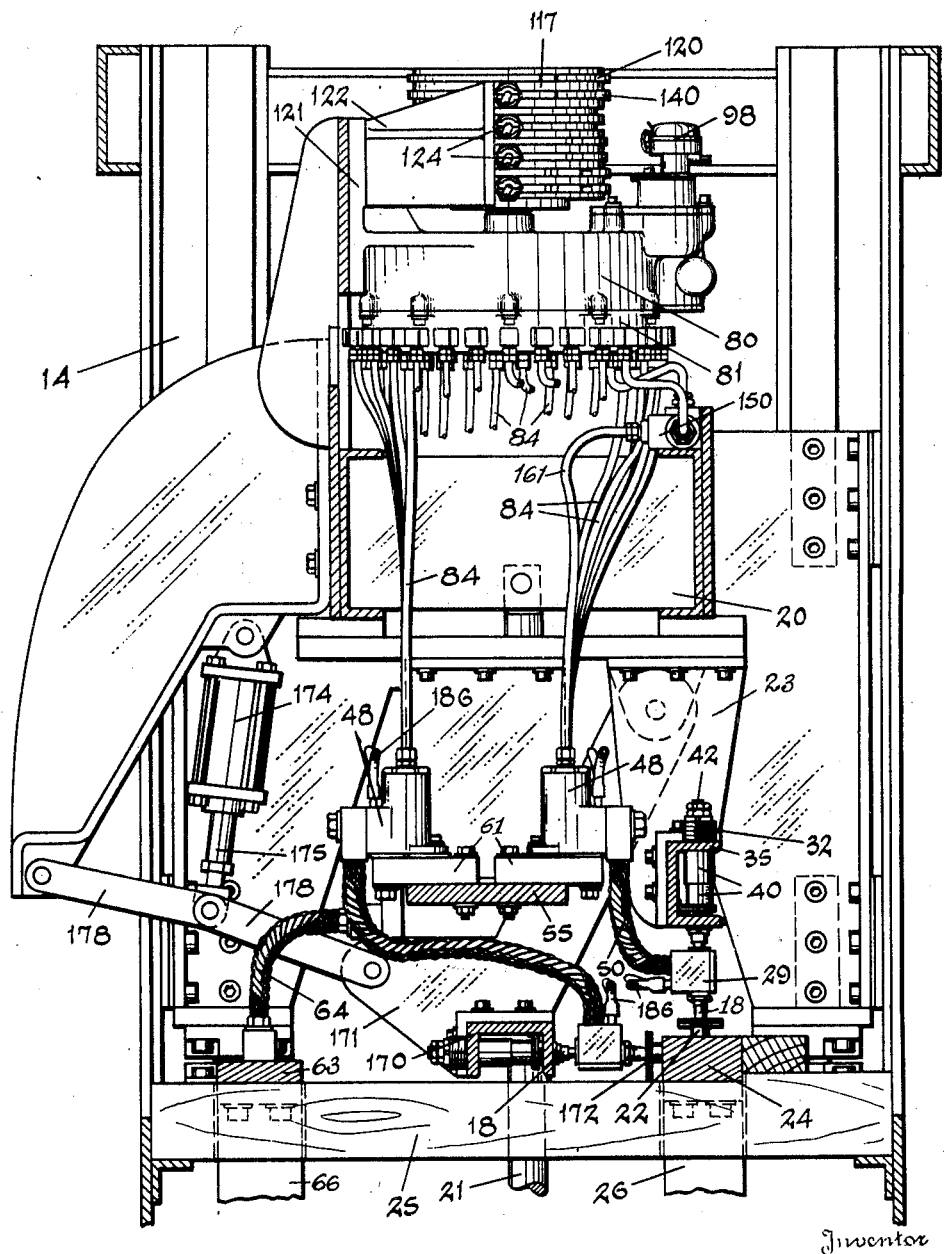
Figure 3:
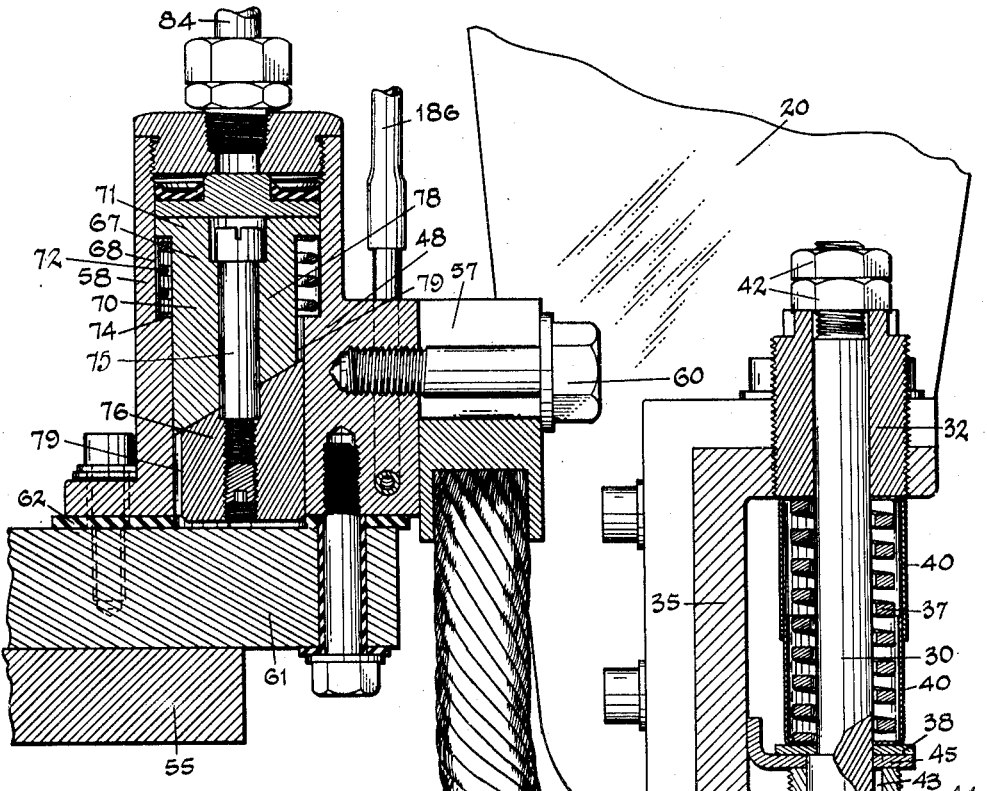
Figure 4:
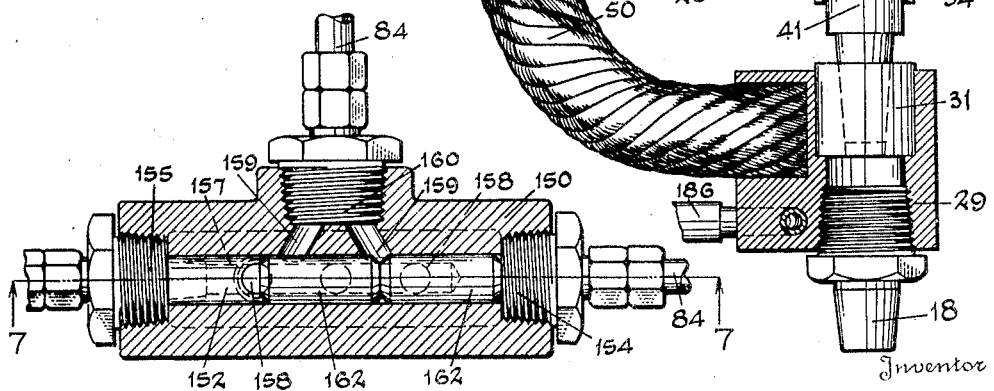

Fig. 1 of the drawings illustrates a front elevational view of a welding machine structure containing the features of my invention. Fig. 2 illustrates a transverse sectional view of the machine, as taken on the plane of the broken line 2—2, indicated in Fig. 1. Fig. 3 illustrates a cross-sectional view, taken through one of the welding units, comprising a pressure switch and a welding electrode. Fig. 4 illustrates a cross-sectional view of a multiple pneumatically-operated valve. Fig. 5 is a view of a section, taken on the plane of the line 5—5, indicated in Fig. 1, of one of the adjustable control valves. Fig. 6 is a view of a section taken on the plane of the line 6—6, indicated in Fig. 5. Fig. 7 is a view of a section of the pneumatically-operated valve, taken on the plane of the line 7—7, indicated in Fig. 4. Fig. 8 illustrates a top view of one of the electrical switches of the machine. Fig. 9 is a view of a section taken on the plane of the line 9—9, indicated in Fig. 1, and illustrates a mechanical means for producing distribution of the electrical and pneumatic energy utilized by various elements of the machine. Fig. 10 is a top plan view, a part thereof being in cross-section, to show certain of the details of the mechanical means, shown in part in Fig. 9. Fig. 11 illustrates, diagrammatically, the electrical and pneumatic connections between the parts of the machine and their controlling means.

The welding machine shown in the drawings, for the purpose of illustration, has a supporting frame 14, on which is mounted a pair of cylinders 15. Electrodes 18 are mounted on a movable frame 20, which is caused to move by the pressure in the cylinders 15, that actuate pistons located in the cylinders and connected by the piston rods 21 to the frame 20. Upon manipulation of suitable valves, the cylinders 15 may be connected to a source of supply of air under pressure, and the movable frame 20 and electrodes 18 will be moved, to engage the work.

The parts of the work, which are to be welded together, are located on the electrodes 22, which may be secured in a bar 24. The bar 24 is insulatingly mounted in the frame 14 on a platform 25 of insulation material, and is connected, by a conductor 26, to one side of the secondary 27 of the welding transformer 28 (Fig. 11). Since the welder electrodes 18, simultaneously, approach and contact the work, upon movement of the work frame 20, they act to press parts of the work against the electrodes 22 and afford an effective holding means for maintaining the work in position.

In order to compensate for any variance of pressure throughout the length of the work, each of the welder electrodes 18 is caused to resiliently engage the surface of the work. As shown, particularly in Fig. 3 of the drawings, each of the electrodes 18 is secured in a block 29, which is insulatingly attached to the end of a rod 30, by an insulating sleeve 31. The rods 30 are slidably supported in a U-bar 35, which is carried by the movable frame 26. Each rod and electrode are restricted in their movement by a pair of threaded sleeves 32 and 34, located in the sides of a U-shaped bar 35, which is connected to the movable frame 20. Intermediate the sleeves is a spring 37, which adjustably engages a ring 38, which shoulders on the rod 30 to bias the movement of the rod in one direction. The spring 37 is contained within a pair of telescoping shells 40, one of the shells bearing against an end of the sleeve 32, while the other sleeve is pressed against the ring 38, which engages a shoulder on the rod 30 formed by an enlarged portion 41 and located within the sleeve 34. Thus, rotation of the sleeve 32, in either direction, will modify the resistance of the spring 37. The sleeve 34, which is mounted in one side of the U-bar 35, defines the limit of the downward movement of the rod 30, as urged by the spring 37, and the extent of its reactant effect upon the pressure applied or sustained by the electrode 18. Thus, when it is found expedient to alter the cushioning effect of the spring 37, or when the electrode 18 does not, securely, contact the work, the sleeve 34 may be rotated to, properly, locate the electrode 18 with reference to the work. Also, the sleeve 32 may be rotated to modify the tension of the spring 37, to produce a desired pressure on the work. The relationship of the rod 30, with reference to either of the sleeves 32 or 34, may be moderately altered and minute adjustments may be made by lock nuts 42, threaded onto the end of the rod 30 and bearing against the sleeve 32. Preferably, the sleeve 34 is, also, engaged by a set screw 44. The enlarged portion 41 of the rod 30 is provided with a channel 43 for receiving a tongue of a lock washer 45. The set screw is located in a flange of the U-bar 35 to prevent loosening, or rotation, of the threaded sleeve 34, when a desired setting has once been obtained. If desired, one of the shells 40 may be provided with suitable indicating lines, or legends, or both, to afford ready observation of the effective reactability of the spring contained within the telescoping shells, for the purpose of adjustment of the spring.

The electrodes 18 may be positioned as will most advantageously attain their contact with the work. When it is necessary to dispose them in planes at various angles to the vertical to properly engage bent portions of the work, the U-bar 35 may be, accordingly, shaped, to present the electrodes at, substantially, a right angle to the surface of the work.

In order to, conveniently, complete the circuit of the transformer secondary through the electrodes 18, the electrodes are each connected, through the block 29, to a pressure-actuated switch 48, by a short, flexible conductor 50. The conductors, thus, may be of a substantially uniform, short length and all parts of each conductor may be well spaced from the contiguous conductors, so that the electrical conductivity is not impaired by differences in the conductor lengths, as might be the result where considerable distance is found requisite between certain of the electrodes and their associated switches, and the same voltage may be used to produce the same current at the electrodes.

In the form of construction shown in the drawings, the mobility of the switches enables adjusted movement of the switch, relative to its associated electrode, within the limitations of the length of the conductor. To enable location of the switch, adjacent the movable electrode 18, a secondary terminal bar 55 is secured to, and insulated from, the movable frame 20, proximate to the U-shaped bar 35, and is designed to have a suitable dimension for placement of the switches along its surface and within the desired vicinity of their related electrodes 18.

The short, flexible conductor 50 (Fig. 3) may be readily connected to a block 57, which is secured to the casing 58 of the switch, by a bolt 60. The casing 58 is mounted on a secondary terminal block 61. The switches may be insulated from each other, by means of insulating plates 62 and suitable sleeves, through which the connecting bolts extend. The blocks 61 are mounted on and secured to the terminal bar 55. The transformer secondary 27 is connected to the bar 63 and the conductor 64 connects the bars 63 and 55. If desired, a plurality of conductors 64 may be used to reduce the resistance in the secondary circuit. The conductors 64 (Fig. 2) have a length to allow for travel of the carrier frame within desirable limits. The circuit of the secondary 27 is, thus, through the conductor 26, the bar 24, the electrodes 22 and 18, the conductor 50, the switches 48, and, upon operation of each of the switches, the current flows through the terminal bar 55, the conductors 64, the bar 63, and conductor 66.

A pneumatically-actuated piston 67 is reciprocably mounted in the cylindrical bore 68 of the casing 58. The bore 68 has two diametric dimensions to accommodate the body portion 70 and head 71 of the piston, and a spring 72 is positioned between the head 71 and the shoulder 74 formed in the wall of the shell 58. The spring 72 acts to return the piston 67, upon the release of the pneumatic pressure. Preferably, the body portion 70 of the piston is formed of two parts, interconnected by a bolt 75 and having their proximate surfaces located in a plane inclined to the axis of the piston. To sustain the two portions of the piston in spaced relation, as against undesirable play or tight engagement, between the angularly disposed surfaces, the drilled hole, into which the bolt 75 is threaded, is located in the part 76 of the piston and the opening, in which the shank of the bolt is located, is larger than the shank and is located in the part 78. When the piston 67 is urged toward the secondary terminal block 61, the two parts of the piston move in unison until the part 76 contacts the surface of the block, whereupon continued pressure on the part 78 causes axial displacement of the part 78, relative to the part 76 of the piston by reason of their angularly disposed faces, and the part 76 will be, wedgingly, forced, not only against the secondary terminal block 61, but, also, against the wall of the casing 58. The circuit of the secondary 27 will, thereupon, be completed through the switch 48, the conductor 50, and the electrode 18 to the work to effect the weld. The parts 76 and 78, of the piston 67, may, also, have relieved surfaces 79 formed thereon. The surfaces 79 are, diametrically, opposite each other and will, when the part 76 contacts the block 61, allow a short sliding movement to maintain a clean surface contact between the bottom of the lower piston part and the terminal block.

As illustrated in the drawings, the switches 48 are sequentially, actuated by a pneumatic distributing element that, also, establishes, mechanically, a predetermined time period for completing the secondary circuit of the transformer 28, during the interval of each switch actuation, to produce the weld. Provision may, also, be made for modifying the intervals of switch actuation, or the time period of each weld, and the potential of the secondary circuit of each weld, according to the character of the weld to be produced or the thickness or character of the metal being worked upon. The switches 48 are connected by suitable pipe conduits to a distributor casing 80. The casing 80 is mounted on the carrier frame 20. The casing 80 is provided with an annulus 81, having passageways 82 located in equidistantly spaced relation to each other. The passageways 82 communicate with tapped openings, to which threaded connection of the conduits 84 may be made. The passageways are, sequentially, connected to a source of supply of pneumatic pressure, by means of a rotor 85. (Fig. 9.)

The rotor is located within the casing 80 and is suitably drilled to provide two ports 83, which register with the diametrically opposite passageways 82 and are connected, by a diametrically extending passageway 87 formed in the rotor, with the bored stem 88 of the rotor. A conventional form of swivel joint 89 may be utilized for attaching the stem to the source of supply of pneumatic pressure. The rotor 85 is operated through a train of gears from a motor 90. (Figs. 9, 10, and 11.) The motor shaft drives a gear shaft 91 and, through the speed translating or reducing gears 92, mounted thereon, the gear shaft 94 having a gear 95 located in meshing relation with a suitable ring gear 97 secured on the rotor. The shaft 91, also, operates a pair of timers 98, by gears 100 intermeshing with a gear 101 on the shaft 91. The ratios of the interrelated gears 92, 95, 97, 100, and 101 are such that the shafts of the timers 98 complete one revolution as the rotor 85 moves in sequential registration from port to port. The timers provide the requisite time period of the weld, its extent being predeterminable upon the setting and length of the cams 102.

The timers may partake of any conventional construction, each having a usual form of circuit closer switch 103 adapted to be closed and opened by a cam 102, the initial moment of the opened and closed periods of each switch being adjustable by shifting of the timer case. The circuit closer switches 103 are connected in series with the coil 104 of a magnetic relay 105, which completes the circuit of the primary 106 of the transformer 107 through the switch 108 to the main switch 109 and the supply lines 110. Through the use of two circuit closers, the timing of the operations of the circuit closers may be adjusted in relation to each other to vary the energized period of the relay 105 and, accordingly, the period for the flow of the welding current through the switches 48.

When it is found necessary to adjust the timing of the period of the weld, as controlled by the cams 102 and circuit closers 103, the circuit closers may be arcuately moved, with reference to the cams, to alter their position and their opening and closing movements. (Figs. 8 and 11.) Each of the casings 111 of the timers 98 are provided with a plate 112, having a finger portion extending therefrom. Each circuit closer 103 is mounted within the casing 111 and is operated by a cam 102. Each plate 112 may be adjusted relative to its associated cam and secured against movement, by a bolt 113, located in a slotted portion of the plate. Thus, the initiation or completion of the weld period may be controlled by the positioning of either of the circuit closers 103, since the switches are connected in series in the circuit of the relay 105 and will open or close the circuit, according to the predetermined positions of the circuit closers and the depressed portions 119 of the cams 102. The circuit for the coil 104 of the relay 105, upon closure of the circuit closers 103, is completed through the switch 114 to the supply lines 115.

In order to adapt the controlling circuits to any character of work and to obtain a maximum amount of efficiency, both in the operation and welds produced, means is provided herein for adjusting the interval of the pressure period by the speed of the motor 90, adjusting the potential of the welding current emanating from the transformer 107 to the primary 116 of the welding transformer 28 and, the period of flow, by means of the circuit closers 103. The interrelation of these facilities and their utilization produces a welding control medium whereby metals of various thicknesses may be welded during a single operation without interruption of the welding cycle or production of improperly formed welds in areas of increased resistance to the flow of welding current.

Where it is found advantageous to protect the electrode 18, as well as the surface of the metal, by affording periods of momentary cessation of the flow of welding current when a period of weld is necessarily lengthened, means may, also, be provided, whereby the pneumatically created impulse of contact in the switch 48 may be repetitively applied and the related electrode 18 will, thus, carry the flow of welding current a number of times in sequence, the recurrence of the flow of the welding current being spaced by intervals to enable cooling of the electrode engaged thereby.

To carry out the above described features of my invention, a drum 117 is mounted on the bored stem 88 of the rotor 85. The annular exterior surface of the drum has formed therein a plurality of grooves 118, in which arcuate cams 120 may be positioned. The cams 120 are of such lengths as may be determined to produce required periods of control and are so located with reference to the movement of the rotor 85 as to actuate controlling devices when a port 83 of the rotor registers with the passageway 82, identified with the pipe conduit of the switch 48 and electrode 18 to be controlled. Thus, when it is found desirable to diminish the speed of the motor 90, the cams 120 may be adapted to actuate suitable valves, which are included in the pneumatic system of the machine.

For convenience of assembly, the casing 80 has a supporting wall portion 121, upon which a pair of brackets 122 are secured. The brackets 122 support a chambered valve casing 123 and a plurality of switches 124. The valve casing 123, a detail of which is illustrated in cross-section in Figs. 5 and 6, is connected, at one end thereof, to an air supply pipe 125, by a conduit 127, and, at its opposite end, to the air motor 90, by a conduit 128. (Figs. 10 and 11.) The air supply enters the casing 123 and flows through the passageway 130. Valves 133 are located at regular intervals within the passageway 130. The valves are provided with chambers 131, which are connected to the passageway 130, upon actuation of the valve members. The chamfered orifice of each valve 133 is closed by a spring-loaded plunger 132, which seats in the orifice and is removed therefrom by a pin 134. The pin has an outwardly extended portion, which is positioned in the path of certain of the cams 120 on the drum 117. Each of the valve chambers 131 communicates, through a metered port, with a passageway 135 connected to the motor 90 by the conduit 128. The effective area of the metering port is determined by a needle valve 137, which may be designed for ready adjustment, at a point external to the valve casing 123. Preferably, the needle valves 137 are adjusted, with respect to each other, to graduate the speed of the air motor 90 upon regular and graduated enlargement of the metered ports connecting the chambers 131 with the passageway 135.

As diagrammatically illustrated in Fig. 11 of the drawings, the valves 133 are connected to the source of supply of air pressure 138 by the conduits 127 and passageways 130. The valves and their actuating pins 134 are spaced within the valve casing 123 to locate the pins in positions of actuation by cams 120 supported in the alternate grooves 118 of the drum 117. As shown in detail in Figs. 5 and 10, the leading, chamfered end of one cam extends over the rear or following end of a preceding cam so that the variance in motor speed may be accomplished without interruption to the continuance of the operation of the motor.

The cams 140, located in the grooves 118 intermediate the grooves wherein the cams 120 are secured, engage pins 141 in actuating relation to operate the switches 124. The switches 124 are located, on a bracket similar to the bracket 122, diametrically opposite the valve casing 123, in relation to the drum 117. (Figs. 10 and 11.) The switches, normally biased to an open position, are connected by a line 142 to one side of the primary 116 of the welding transformer 28, suitable connection of the other side of the primary being made to one side of the secondary 145 of the transformer 107. The switches 124 complete the circuit from the line 142 and one side of the primary 116 to various taps made in the winding of the secondary 145. The potential of the electric current flowing from the secondary 145 of the transformer 107 will, thus, be varied according to the location of the actuating cams 140. The cams have a length, substantially the same as the cams 120 and, preferably, are located with respect to the cams 120, associated therewith, to reduce or increase the potential of the electric current flowing to the primary 116, simultaneously, with any modification in the speed of the air motor 90. The cams 120 and 140 may, therefore, be arranged in groups or pairs of associated grooves 118 in the drum to produce the desired control of their respective systems. The cams 120 and 140 are, also, located with reference to the sequential registration of the ports of the rotor 85 with the passageways 82, so that the particular welders associated therewith perform, through their switches and electrodes, their required operations.

In one embodiment of my invention, and as illustrated in the drawings explanatory thereof, the cams 120 and 140 are so located on the drum 117 that one working cycle of an operated welder electrode unit will transpire during a portion of one revolution of the drum. The drum and the casing 80 may be adapted to initiate and/or control a plurality of work cycles, in repetition or separately. The passageway 81, extending diametrically through the rotor 85 to connect the outlet ports 83 with the source of supply of pneumatic pressure, thus, furnishes such pressure for an inactive period to one of the ports of the rotor until the port approaches registration with the passageway 82 connected to one of the pneumatically-operated switches 48. Also, traversal of one of the outlet ports 83 of the rotor and consequent registration with plugged ports in the casing 80 will produce a reactant pressure on the opposite outlet port to effect a satisfactory seal as it comes into registration with a passageway 82 connected to one of the pipe conduits 84.

Where a suitable controlling period has been established by the lengths and location of the cams 120 and 140 on the drum 117, a further increase in metal thickness may require a variance in the setting thus afforded, or the heat producible by an extended period of the weld may require such a variance to prevent overheating of the metal or the electrode tip. The switch 48, associated with the electrode 18 abutting the surface of a part of the work having a greatly increased thickness, may, thus, be connected to a multiple accumulator valve 150 (Figs. 4 and 7), whereby the desired mode of control by the cams may be maintained, yet any one of the switches 48 may be connected to a plurality of passageways 82 to be actuated thereby. The casing 151 of the valve 150 is provided with a chamber 152, the ends of which terminate in threaded outlets 154 and 155. The chamber 152 is connected to a chamber 157 by a plurality of passageways 158, the axes of the chambers 152 and 157 being in substantially parallel relation. Opening into the chamber 152 is a pair of laterally extending passageways 159 connecting the chamber with a threaded outlet 160. The outlets 154, 155, and 160 may be connected by certain of the pipe conduits 84 to the casing 80 so that, upon registration of the port 83 of the rotor 85 with the passageways 82 associated therewith, pneumatic pressure will be introduced into the chamber 152 and through one of the passageways 158 to the chamber 157. The chamber 157 is connected to the designated switch 48 by a pipe conduit 161. In order to prevent escape of the pressure from its intended course, through any of the other outlets, since the conduits 84 connected thereto will then be opened to the atmosphere, the chamber 152 has located therein a pair of plungers 162. The plungers have beveled or chamfered ends and are of such suitable length that their contiguous faces abut each other in the vicinity of the openings of the laterally extending passageways 159. As positioned in Figs. 4 and 7, the plungers 162 have been moved to expose the passageway 158 most proximate to the outlet 155 of the chamber 152 and the conduit 84 communicating therewith. Upon subsequent registration of one of the ports of the rotor 85 with the passageways 82 connected to the valve 150 by the conduits 84, the plungers will be moved to expose one and then the other of the passageways 158, which are covered and closed by said plungers. When the pneumatic pressure is directed to either of the laterally extending passageways 159 from the outlet 160, it will cause separation of the plungers at the point of their abutment and closure of the passageways 158, located most proximate the ends of the chamber 152. Where it may be found advantageous, the chamber 157 may be provided with a plurality of threaded outlets for connection to a series of switches 48, whereby the accumulative action afforded by the valve 150 may effect a series of switches to repeat closure of the welding circuit.

As diagrammatically illustrated in Fig. 11, the right-hand switch 48 is under pressure to indicate the flow of welding current therethrough to its related electrode. Upon movement of the rotor 85, in a clockwise direction, the next passageway 82 will be connected, by a conduit 84, to the multiple valve 150 and, through the pipe conduit 161, to the left-hand switch 48. Thereafter, the next succeeding passageways 82 will be put in conduit connection with the valve 150. Thus, metal located beneath the associated electrode will be, periodically, connected to the secondary 27 of the transformer 28, the periods of connection being interrupted by movement of the rotor to allow cooling of the electrode and the metal. Also, as shown in Fig. 11, it will be noted that the pins 134 and 141, operating their associated valve 123 and switch 124, respectively, and actuated by the cams 120 and 140, respectively, in the uppermost pairs of grooves 118, are approaching the ends of their cams and during the interval of their controlled engagement, the speed of the pneumatically-operated motor 90 has been controlled by the related valve chamber 131 to operate the rotor 85 and circuit closers 103 at the predetermined rate for ordinary operation. The switch 124, actuated by the pin 141, is connected by a line 164 to the end of the secondary 145 of the transformer 106 to produce a current flow of high potential to the primary 116 of the welding transformer through the line 142, the switch 124, and the line 164, from the secondary 145.

Progressive movement of the drum 117 will effect engagement of the lowermost cams 120 and 140 with their associated pins 134 and 141, respectively, and actuation of the related valve 133 and switch 124. The speed of the motor 90 will, thereupon, be materially increased as the communications from the source of supply of pneumatic pressure to the motor are amplified. The circuit of the secondary will, also, be varied upon closure of the switch 124. The switch is connected to the innermost tap of the secondary 145 by a line 165 and through the switch 124 and line 142 to reduce the potential of the current flowing to the secondary 116 of the welding transformer 28. The modification of control in both the pneumatic and electrical systems will, accordingly, produce, between the weld periods, a shorter interval of the weld periods and a lower potential for the welding current during the actuation of the valve and switch associated with the cams in the lowermost pair of grooves 118, and/or during the direction of the pneumatic pressure through the multiple valve 150.

To afford further modifications and adjustments for the operation of the welding elements, cams may be located in other of the pairs of grooves 118. Upon movement of the rotor 85 to the succeeding passageways 82 in the casing 80, the controls for the motor 90 and the transformer 107 will, thus, be dependent upon the arrangement of the cams and the actuation of the valves 133 and switches 124, as may be predetermined. When the rotor 85 completes, substantially, one-half of its revolution, a welding cycle may, if desired, be accomplished, depending upon the number of welder electrodes 18 and the associated switches 48 connected to the passageways 82 of the casing 80. The operation of the motor 90 may then be halted and the frame 20 elevated for removal of the work.

While the hereinabove description has been made with reference and in relation to any grouping of welder electrodes, provision is made, as an illustrative embodiment of my invention, for a modified grouping of electrodes when operating circumstances will permit. As shown in Figs. 1 and 2, welder electrodes may be mounted in a U-bar 170 and connected by similar flexible conductors of uniform length to related switches 48 supported on the panel 55. The U-bar 170 is a part of a reciprocating frame 171, which is pivotally supported on the carrier frame 20. The U-bar is caused to aline the electrodes with the work, positioned at, substantially, right angles to the work on the projections 22 of the bar 24. The bar 24 may be provided with similar electrodes 172 for engaging such angularly positioned work or angularly bent portions of work; that work having substantially an L-shape. Actuation of the U-bar 170, to move the electrodes into engaging position, may be afforded by a pair of double-action cylinders 174, which are connected to the source of pneumatic pressure 138 by suitable valves, and their piston rods 175 may be connected to the frames 20 and 171 by the links 178. The switches 48 may be connected, by conduits, to passageways in the casing 80 to produce, in sequential order, a flow of welding current through the electrodes, upon completion of the operation of the group of welder electrodes, as previously described, and during the traversal of the portions 180 and 181 of the uppermost cams 120 and 140, relative to the associated valve 133 and switch 124, to complete, substantially, the remainder of half revolution of the drum 117 and the rotor 85.

If desired, and in keeping with common practice, passageways may be provided in the various actuated switch casings 58 and blocks 29, and interconnected by tubing 186 to convey a continuous flow of coolant for removing the heat induced by the operation of the welders.

I claim:

1. In a welding machine, a plurality of welders having welding electrodes for engaging the work; a source of welding current; a plurality of fluid operated switches for connecting the electrodes to the source of welding current; a source of supply of fluid pressure; means for connecting the switches to the source of fluid pressure in succession; a fluid pressure motor connectable to the source for operating the said means; a valve for controlling the speed of the motor; and an element connected to the said means for periodically operating the valve to vary the speed of movement of the element and the length of period in which certain of the electrodes is connected to the source of current.

2. In a welding machine, a plurality of welders having welding electrodes for engaging the work; a source of welding current; a plurality of fluid operated switches for connecting the electrodes to the source of welding current; a source of supply of fluid pressure; rotative means for connecting the switches to the source of fluid pressure in succession; a fluid pressure motor connectable to the source for operating the said rotative means; a valve for controlling the speed of the motor; an element connected to the said rotative means for periodically operating the valve to vary the speed of movement of the element and the length of period in which certain of the electrodes is connected to the source of current; and electric means for selectively varying the current quantity that flows through each electrode according to the work to be done by the electrode.

3. In a welding machine, a plurality of welders having electrodes for engaging the work; a source of supply of welding current; a source of fluid pressure; a plurality of fluid operated switches for connecting the source of current with the electrodes; a plurality of pressure pipes; a means having a movable member for connecting the said source of fluid pressure to the switches in succession through the said pressure pipes; a valve for controlling the fluid pressure from the said means through certain of said pipes and having a movable valve member operated by the pressure in said certain of said pipes; and an outlet pressure pipe connected to the valve and to a switch to produce repetitive operations of the switch.

4. In a welding machine, a plurality of welders having electrodes for engaging the work; a source of supply of welding current; a source of fluid pressure; a plurality of fluid operated switches for connecting the source of current with the electrodes; a plurality of pressure pipes connected to the said source of fluid pressure; a means having a movable member for connecting the switches in succession with the said pressure pipes; a valve for controlling the fluid pressure from the said means through certain of the said pipes and having a plurality of movable valve members operated by the pressures in said certain pipes; and a pipe connecting the valve and a switch to produce repetitive operations of the switch.

5. In a welding machine, a plurality of welders having electrodes for engaging the work; a source of supply of welding current; a source of fluid pressure; a plurality of fluid operated switches for connecting the source of current with the electrodes; a plurality of pressure pipes; a means having a movable member for connecting the said source of fluid pressure to the switches in succession through the said pressure pipes; a valve for controlling the fluid pressure from the said means through certain of said pipes and having a movable valve member operated by the pressure in said certain of said pipes; an outlet pressure pipe connected to the valve and to a switch to produce operations of the switch; a fluid pressure motor connectable to the source for operating the said means; a valve for controlling the speed of the motor; and an element connected to the said means for periodically operating the valve to vary the speed of movement of the element and the length of period in which certain of the electrodes is connected to the source of current.

6. In a welding machine, a plurality of welders having electrodes for engaging the work; a source of supply of welding current; a source of fluid pressure; a plurality of fluid operated switches for connecting the source of current with the electrodes; a plurality of pressure pipes; a means having a movable member for connecting the said source of fluid pressure to the switches in succession through the said pressure pipes; a valve for controlling the fluid pressure from the said means through certain of said pressure pipes and having a movable valve member operated by the pressure in said certain of said pipes; an outlet pressure pipe connected to the valve and to a switch to produce operations of the switch; and an electric means for varying the current quantity; and means for connecting certain of the electrodes with said electric means during the connection through the said switches associated with the said certain of the electrodes.

7. In a welding machine, a source of fluid pressure; a fluid pressure motor connected to the said source; a rotor operated by the motor; a plurality of restriction valves for restricting the flow of fluid under pressure to the motor to vary the speed of the motor; a source of supply of electric current; a variable transformer connected to the source of supply of electric current and having current regulative potential terminals; a plurality of welders, each welder having an electrode for engaging the work; a plurality of fluid operated switches for completing the connections of the variable transformer to the electrodes; a plurality of electric switches; and the rotor having a rotatable connector for connecting the said switches in succession to the source of fluid pressure, and having rotatable members to complete the connection of the operated switch to its associated electrode with a selected voltage terminal and for operating the restriction valves to vary the period of flow through the electrodes and the work.

8. In a welding machine, a plurality of welders having welding electrodes for engaging the work; means for moving the welders and simultaneously pressing the electrodes against the work with a welding pressure; a source of welding current; a plurality of fluid operated switches, a switch associated with each electrode for connecting its associated electrode to the source of welding current; a source of fluid pressure; a step-by-step means for connecting the switches to the source of fluid pressure in succession; and an electric means including a plurality of switches operated by the step-by-step means for selectively varying the current quantity that flows through each electrode and its associated switch as it is sequentially connected to the source of welding current according to the work to be done by the electrode.

HUGO PURAT.